Oct. 18, 1932.  C. NAGEL  1,883,855
AUTOMATIC WEIGHING MACHINE
Filed Feb. 14, 1930   3 Sheets-Sheet 1
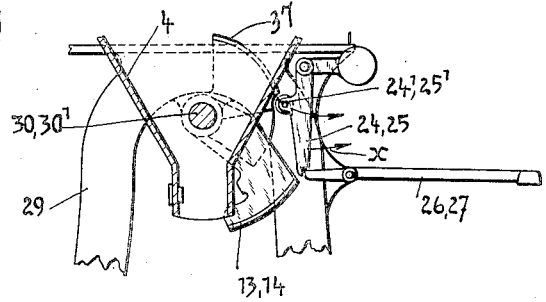
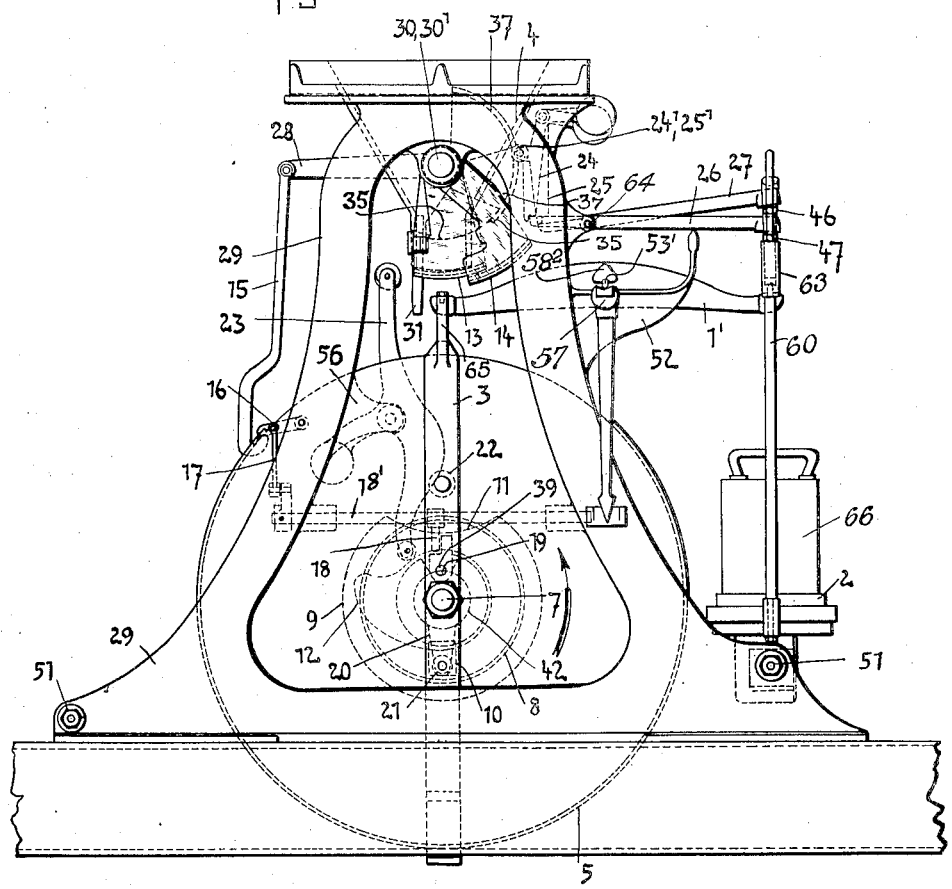
Inventor
Carl Nagel
Attorney

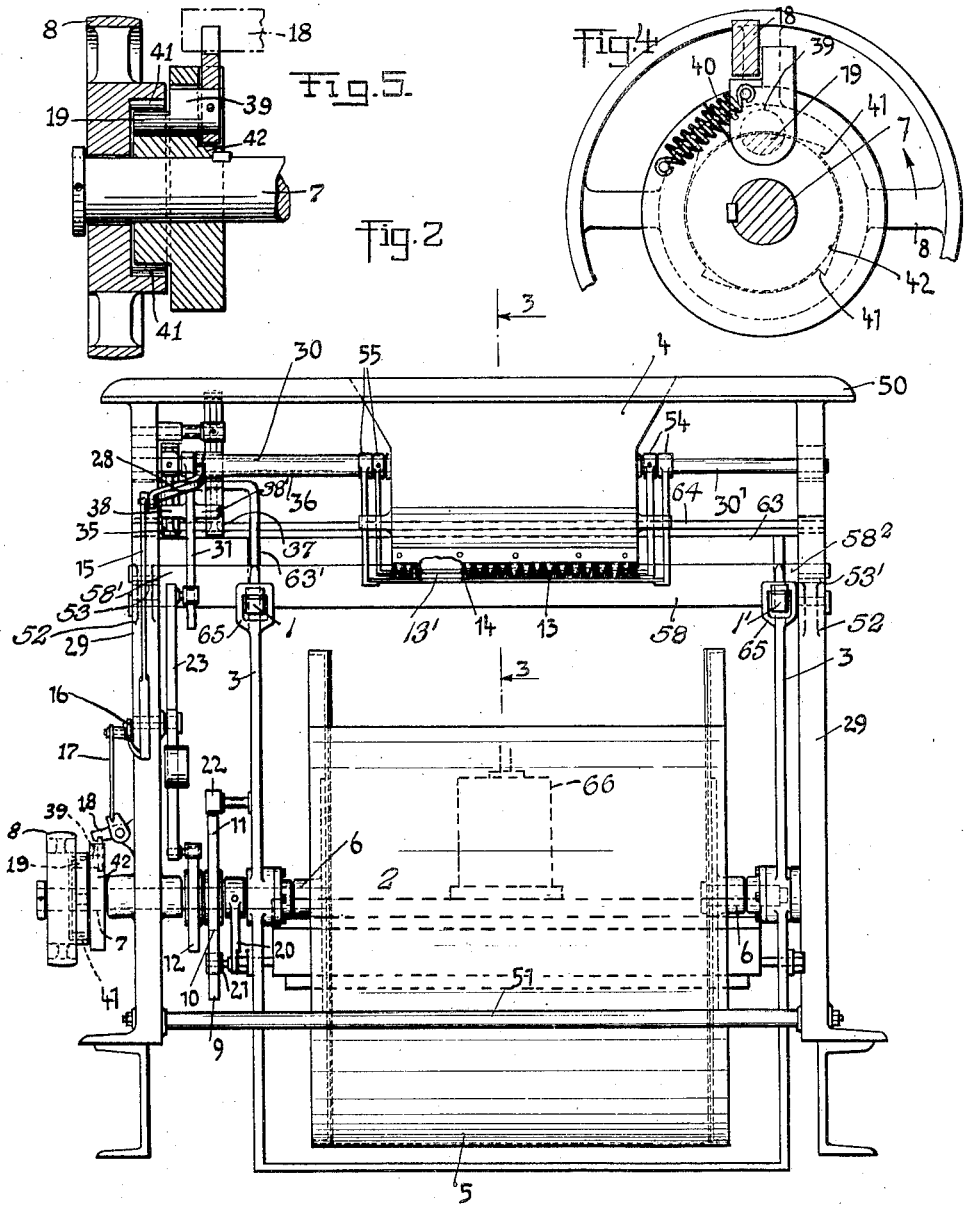

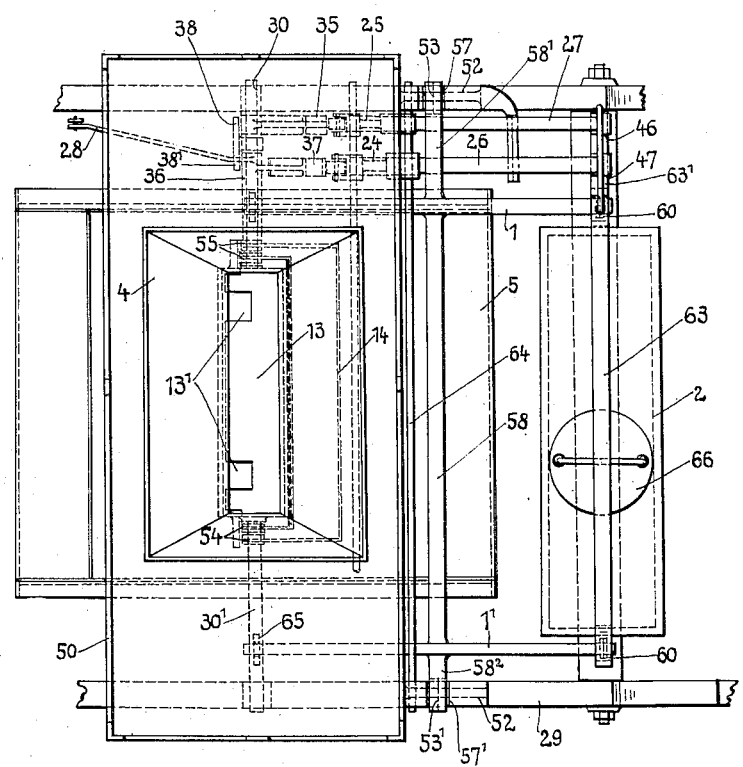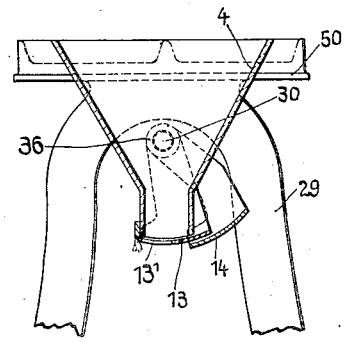

Patented Oct. 18, 1932

1,883,855

UNITED STATES PATENT OFFICE

CARL NAGEL, OF GLIESMARODE, GERMANY, ASSIGNOR TO LIBRAWERK M. B. H., OF GLIESMARODE, GERMANY

AUTOMATIC WEIGHING MACHINE

Application filed February 14, 1930, Serial No. 428,527, and in Germany June 15, 1928.

Patents were applied for in Germany on June 15, 1928; France on November 26, 1929; Italy on December 17, 1929; Belgium on December 19, 1929; Czechoslovakia on December 20, 1929; Great Britain on January 6, 1930.

My invention relates to improvements in automatic weighing machines.

The object of the improvements is to provide a weighing machine in which, after filling, the receptacle is coupled with operating mechanism for discharging the material. At the end of the discharging operation the receptacle may be closed or returned into initial position either automatically or by the said operating mechanism. Further the operating mechanism may be used for opening the devices for supplying the material to the receptacle.

For the purpose of explaining the invention an example embodying the same has been shown in the accompanying drawings, in which the same letters of reference have been used in all the views to indicate corresponding parts. In said drawings Fig. 1 is an end elevation showing the weighing machine, Fig. 2 is a side elevation as viewed from the left in Fig. 1, certain parts being omitted for clarity of disclosure, Fig. 3 is a detail sectional elevation taken on the line 3—3 of Fig. 2, and Fig. 4 is an elevation on an enlarged scale showing the means for coupling the weighing receptacle with the operating mechanism thereof.

Fig. 5 is a vertical section of the clutch mechanism illustrated in Fig. 4.

Fig. 6 is a plan of the mechanism and Fig. 7 a section through the funnel and the closures therefor.

In the example shown in the figures the weighing machine comprises a frame composed of uprights 29, a top plate 50 and braces 51. On brackets 52 the weighing beams 1, 1' are supported by means of knife-edge bearings 53, 53'. The vertical arms of the bail 3 for the receptacle are hung upon the corresponding ends of the two weighing beams 1, 1', by means of eyes at 65. The weighing beams are rigidly connected to one another by means of a bar 58 which forms a fulcrum for the weighing beams. This bar 58 is elongated so as to extend beyond the outer sides of the two weighing beams 1, 1', thus providing extensions $58'$ and $58^2$. The extensions $58'$, $58^2$ carry knife edges 53, 53' resting on blocks 57 and 57', the blocks 57, 57' being carried by brackets 52 of the machine frame 29.

The weighing beams at their other ends are provided with knife edges engaging seats in a cross bar 63, from which are suspended two links 60 which support a plate 2 serving as a poise receiver for weights 66. The upper cross piece 63 extends to the left of link 60, as indicated at 63' in Figs. 2 and 6, and the extension is provided with two upwardly extending lugs 46, 47. As the poise receiver 2 rises and the receptacle 5 descends these lugs successively strike the free outer ends of levers 26, 27, which are pivoted on or attached to shaft 64 for oscillatory movement and which thereupon release the levers 24, 25, hereinafter described, so as to permit the closures 13, 14, to assume successively their closing position under the funnel 50. The receptacle 5 for the materials to be weighed is supported by means of studs 6 pivoted in the vertical arms of bail 3. Above the said receptacle a funnel 4 is mounted on the top plate 50 and the opening of the said funnel is adapted to be closed by a main gate 13 and a subsidiary gate 14, both gates having a common axis. At the right of Fig. 2 the said axis coincides with that of a shaft 30' supported at one end by the adjacent frame 29 and at the other end by the funnel 4, and at the left of the figure the axis is fixed by that of a similarly supported solid shaft 30 and a tubular shaft 36 telescoped thereon. On the shaft 30' the hubs 54 of the gates 13—14 are rockingly mounted, and the left hand hubs 55 of the said gates are fixed respectively to the shafts 30 and 36 the said shafts being provided with operating members 35 and 37 respectively. On one of the uprights 29 of the frame a shaft 7 carrying a constantly rotating pulley 8 is journaled, and the said shaft is in axial alignment with the pivot bolts 6 when the receptacle 5 is in normal position. Between the pulley 8 and the shaft 7 a clutch is located, which is shown in detail in Fig. 4 and which comprises a rockable pawl 39 mounted in a sleeve 42 at the righthand side of the pulley 8 said sleeve being splined on shaft 7, and the pawl having a segmental tooth 19 adapted for engagement with any one of a series of notches 41 in the inner periphery of a bore in the hub of pulley 8. A spring 40 tends to rock the pawl 39 to bring its tooth 19 into coupling engagement with the notches 41. The said clutch is adapted to transmit the rotary movement of the pulley 8 to the shaft 7. To the opposite end of the shaft 7 there is secured a disk 9 formed with a radial slot 10 and a recess 11, and a cam disk 12 is also secured to shaft 7. One arm of the bail 3 has a roller 22 journaled thereon which roller is adapted for engagement with the bottom of recess 11 of the disk 9 upon the lowering of receptacle 5. The radial slot 10 of the disk 9 receives a roller 21 which has a certain clearance in the slot and which is mounted on an arm 20 secured to one of the pivot bolts 6 of the receptacle 5.

On a bracket 56 on the upright 29 at the left in Fig. 1 a weighted lever 23 is rockingly mounted and is in engagement with the cam disk 12, and on the shaft 30 a lever 31 is rockingly mounted which lever is provided with lugs 38 and 38′ adapted to engage the respective members 35 and 37 for operating gates 13 and 14 for opening the funnel 4. Normally the said members are held in position for opening the funnel by means of weighted levers 24 and 25 carrying rollers 24′, 25′ engaging the operating members 35 and 37 respectively. By means of the said mechanism the cam 12 can cause the gates to open. Normally the levers 24 and 25 are held in position by levers 26 and 27 engaging notches in the downwardly directed ends of the levers 24 and 25 when the gates 13 and 14 are in position for opening the funnel. The second gate 14 is connected by an arm 28, a link 15, an arm 16, and a link 17 to an arm of shaft 18′ carrying a clutch operating finger 18 which is adapted to disengage and hold clutch element 39 in unclutched position.

After the receptacle 5 has been nearly filled the lug 46 connected with the cross bar 63 engages the free end of the lever 27 for rocking the same upwardly and out of locking engagement with the lever 25. The gate 13, which is formed with narrow slots 13′ permitting a reduced flow of material therethrough, rocks by gravitation into position for reducing the flow material from the funnel, the member 35 rocking the lever 25 in the direction of the arrow shown in Fig. 3.

When the receptacle 5 has been filled to the desired weight a lug 47 connected with the poise receiver 2 which has now moved further upward engages the lever 26 and lifts the same into position for releasing the lever 24, so that the gate 14 rocks by gravitation into position for closing the funnel. The member 37 rocks the lever 24 in the direction of the arrow $x$ (Fig. 3). While the gate 14 is being closed the hollow shaft 36 connected therewith rocks the arm 28 in upward direction, and the said arm through link 15, lever 16 and link 17 rocks the clutch-operating finger 18 to engage the pawl 39, and cause it to rock so as to remove its tooth 19 from the notch 41 which it previously engaged. The pawl 39 when the finger is moved out of contact therewith is rocked by the spring 40 so that the tooth 19 of the pawl enters one of the notches 41 of the revolving pulley 8. Thereupon the rotary movement of the pulley 8 is transmitted by the pawl 39 and the sleeve 42 to the shaft 7, which shaft turns therewith the receptacle 5 through the intermediary of the disk 9 and the arm 20 so as to cause the receptacle to dump its load.

By the operation of the machine so far described the receptacle 5 has been lowered and it is now elevated preliminary to discharging its load by the roller 22 which is moved out of its position in the recess 11 of the disk 9 due to rotation of said disk. The disk takes part in the rotary movement of the receptacle 5, and the roller 22 rides on the wall of the recess and on to the circular portion of the disk 9 so that the axis of the pivot bolts 6 of the receptacle 5 is again in alignment with the driven shaft 7.

By the driving mechanism shown in the figures the receptacle 5 is rotated through an angle of 360° for the delivery of the weighed material. Shortly before the end of the rotary movement the cam disk 12 opens the gates 13, 14 through the intermediary of the weighted lever 23 and the lever 31, whereupon the gates are locked in open position by the levers 24 and 25. The gates 13 and 14 operate the connections 28, 15, 16, 17 so that the arm 18 gets into position for engaging the pawl 39, which pawl is rocked by the arm 18 in opposition to the spring 40 and out of engagement with notches 41. Thus the shaft 7 is disconnected from the pulley 8 and the whole mechanism is at rest.

While, in describing the invention reference has been made to a particular example embodying the same, I wish it to be understood that my invention is not limited to the construction shown in the drawings and that various changes may be made in the general arrangement of the apparatus and the construction of its parts without departing from the invention.

I claim:

1. In an automatic weighing machine, weighing mechanism including a receptacle for receiving the material to be weighed, a chute for supplying the material to said receptacle, a gate for closing said chute, means for causing the discharge of the material from said receptacle, normally-disconnected operating means for said discharge-causing means including a shaft, a clutch for driving the shaft, mechanism controlled by the said supplying means for rendering said clutch operative to actuate said discharge-causing means, a cam on the shaft, and connections from said cam for opening said gate.

2. In an automatic weighing machine, weighing mechanism including a pivoted and vertically movable receptacle for receiving material to be weighed and means for holding the receptacle elevated until it has received its load, said receptacle being moved downwardly when loaded and about its pivot axis for dumping its load, means for supplying material to said receptacle until it descends, means for moving the receptacle about its axis to discharge its load, said means including normally disconnected means for transmitting such movement to the receptacle, mechanism controlled by said supplying means for connecting said transmitting means, and means connected to said receptacle-turning means for elevating said receptacle into weighing position preliminary to dumping the load.

3. In an automatic weighing machine, weighing mechanism including a pivotally mounted receptacle for receiving the material to be weighed, mechanical means for causing the discharge of the weighed material, including a rotary shaft, a disk fixed thereon, and a pin and slot connection between the disk and said receptacle for moving the receptacle on its pivot.

4. In an automatic weighing machine, weighing mechanism including a revoluble receptacle for receiving the material to be weighed, and mechanical means for causing the discharge of the weighed material by rotary movement of said receptacle, said mechanical means comprising coupling mechanism including means operative at the end of the prescribed rotary movement for automatically throwing the coupling means out of coupling engagement, a disk formed with a slot, and a pin engaging said slot, said disk and pin being connected respectively with said mechanical means and said receptacle.

5. In an automatic weighing machine, weighing mechanism including a rotatable and vertically movable receptacle for receiving the material to be weighed and means for holding said receptacle elevated until it has received its load, said receptacle descending when loaded, driving mechanism for rotating the receptacle to discharge its load, said driving mechanism including a constantly rotating device coaxial with and normally disconnected from the receptacle when the same is empty, means for connecting said rotating device with said receptacle, and means on said receptacle adapted to be operated by said mechanism for elevating said receptacle into weighing position after the receptacle has received its load and prior to discharge of the same.

6. In an automatic weighing machine, weighing mechanism including a pivotally mounted vertically movable receptacle for receiving the materials to be weighed, driving means for imparting rotary movement to the receptacle to discharge its load including a rotary driving device coaxial with the receptacle when the same is empty, supporting means holding the receptacle elevated until it is loaded and permitting it to move downward as it becomes loaded, means forming part of said driving means and biased to connect said driving device to the receptacle, said means being rendered operative by downward movement of the receptacle, and means forming part of said driving means and serving to elevate the receptacle to such coaxial position preliminary to dumping it.

7. In an automatic weighing machine, weighing mechanism including a rotatably mounted vertically movable receptacle for receiving the material to be weighed and means for holding the receptacle elevated until it has received its load, said receptacle descending when loaded, means for supplying the material to said receptacle, means for causing the discharge of the material from said receptacle, including a shaft coaxial with the axis of said receptacle when the same is empty, a cam on said shaft, a connection between said cam and said receptacle permitting the receptacle to move downward as it becomes loaded, means operated by said cam for returning said receptacle to such coaxial relation preliminary to discharge of its load, and driving means for said shaft and means whereby said driving means is caused to become operative to rotate the receptacle when the receptacle becomes loaded.

In testimony whereof I affix my signature.

CARL NAGEL.